United States Patent [19]

Blunt

[11] Patent Number: 4,940,844

[45] Date of Patent: Jul. 10, 1990

[54] POLYOL-ALKALI METAL SILICATE EMULSION

[76] Inventor: David H. Blunt, 6728 Del Cerro Blvd., San Diego, Calif. 92120

[21] Appl. No.: 177,186

[22] Filed: Apr. 4, 1988

Related U.S. Application Data

[63] Continuation-in-part of Ser. No. 109,530, Oct. 19, 1987, Pat. No. 4,863,518.

[51] Int. Cl.$^5$ .......................... C08T 3/06; C08K 3/00; C08L 82/02; C08L 3/00
[52] U.S. Cl. .................................... 521/116; 106/603; 106/634; 521/54; 521/122; 521/137; 521/138; 521/907; 524/44; 524/46; 524/376; 524/377; 524/447; 524/477; 524/492; 524/501; 524/741; 524/789; 524/791; 524/846; 524/858; 524/869
[58] Field of Search ................... 106/74, 75; 524/492, 524/741, 376, 377, 789, 44, 46, 501, 791, 846, 858, 869; 521/116, 122, 154, 54, 137, 138, 907; 528/44, 76; 525/447

[56] References Cited

U.S. PATENT DOCUMENTS

| | | | |
|---|---|---|---|
| 4,042,536 | 8/1977 | Dieterich et al. | 521/122 |
| 4,234,639 | 11/1980 | Graham | 428/403 |
| 4,282,129 | 8/1981 | Blount | 521/122 |
| 4,325,859 | 4/1982 | Blount | 524/96 |
| 4,331,578 | 5/1982 | Blount | 521/122 |
| 4,376,178 | 3/1983 | Blount | 524/44 |
| 4,863,518 | 9/1989 | Blount | 106/74 |

*Primary Examiner*—Herbert J. Lilling

[57] ABSTRACT

A stable polyol-alkali metal silicate emulsion is produced by mixing and emulsifying an aqueous alkali metal solution, a polyol and an organic compound that will cause the aqueous alkali metal silicate solution to solidify. The polyol-alkali metal silicate emulsion may be used to react with compounds containing at least two isocyanate radicals to produce polyurethane silicate solid or foamed products which may be used for thermal and sound insulation, coating agents, adhesives, caulking agents and molded objects.

22 Claims, No Drawings

POLYOL-ALKALI METAL SILICATE EMULSION

CROSS-REFERENCE TO RELATED APPLICATIONS

This application is a continuation-in-part of my co-pending U.S. patent application Ser. No. 07/109,530 filed Oct. 19, 1987.

BACKGROUND OF THE INVENTION

This invention related to a process for the production of a stable polyol-alkali metal silicate emulsion by mixing an aqueous alkali metal silicate solution or suspension, a polyol and on organic compound that will cause the aqueous alkali metal solution or suspension to solidify.

It is known in the arts that a polyol-alkali metal silicate emulsion can be produced as illustrated in U.S. Pat. Nos. 4,282,429; 4,325,859; 4,376,178; 4,296,211 and Re 31,340.

In U.S. Pat. No. 4,282,129 an alkali metal silicate with a high enough alkali metal oxide content was used to keep the alkali metal silicate in solution and not to solidify or coagulate whereas this invention utilizes an aqueous sodium silicate with a low alkali metal oxide content so it will solidify or coagulate and cause the water to be chemically attached to the alkali metal silicate. U.S. Pat. Nos. 4,296,211 and Re. 31,340 utilizes a dry granular alkali metal silicate which contains only water molecules that are attached to the alkali metal silicate and not an aqueous alkali metal silicate solution or suspension. Aqueous alkali metal silicate solution or suspension with a low alkali metal content is used in this invention.

In the production of polyurethane silicate products utilizing an aqueous alkali metal silicate solution or suspension, a polyol and a polyisocyanate it is necessary to chemically bind most of the water with the alkali metal silicate. The chemical binding of the water with the alkali metal silicate is accomplished by the addition of an organic compound which will cause the aqueous sodium silicate solution with a low alkali metal oxide content to solidify. Certain polyols, especially those with a hydroxyl number greater than 100, will cause the aqueous alkali metal silicate solution with low alkali metal oxide content to solidify when mixed together. When polyols with less than a hydroxyl number of 100 are used an amine compound or a polyol with a hydroxyl number greater than 100 may be added to the mixture of the polyol and aqueous alkali metal silicate to solidify the aqueous alkali metal silicate. Surfactants and stabilizers may be added to improve the stability of the emulsion. These organic compounds do not react with the alkali metal silicate, and the solidification process is not completely understood.

A stable liquid polyol-alkali metal silicate emulsion is produced by emulsifying the following components:
component (a) an aqueous alkali metal silicate solution or suspension
component (b) a liquid polyol
component (c) an organic compound which promotes the solidification or coagulation of the aqueous alkali metal solution or suspension.

COMPONENT (A)

Any suitable alkali metal silicate may be used in this invention such as sodium, potassium and lithium silicates. The alkali metal silicates are preferred to be in an aqueous solution or suspension which contains 20% to 70% alkali metal silicates. It is preferred to use an alkali metal silicate with a $SiO_2:Na_2O$ ratio of 3.4:1 to 2.0:1. The alkali metal silicate with the lowest alkali metal oxide ratio possible and is still water soluble is preferred. The $SiO_2:Na_2O$ ratio may be increased by the addition of oxidated silicates up to a 25:1 ratio. Sodium silicate is the preferred alkali metal silicate. The crude commercial-grade solutions of alkali metal silicate may contain other compounds such as magnesium silicate, calcium silicate, borates and aluminates but is useful in this invention.

COMPONENT (B)

Any suitable liquid polyol (organic polyhydroxyl compound), in particular, compounds which contain from 2 to 8 hydroxyl groups, especially those with a molecular weight of about 400 to about 6,000, e.g. polyesters, polyethers, polythioethers, polyacetals, polycarbonates or polyester amides containing at least 2, generally form 2 to 8, but preferably dihydric alcohols, with the optional addition of trihydric alcohols, and polybasic, preferably dibasic, carboxylic acids. Instead of the free polycarboxylic acids, the corresponding polycarboxylic acid anhydrides or corresponding polycarboxylic acid anhydrides or corresponding polycarboxylic acid esters of lower alcohols or their mixtures may be used for preparing the polyesters. The polycarboxylic acid may be aliphatic, cycloaliphatic, aromatic and/or hetercyclic and may be substituted, e.g., with halogen atoms and may be unsaturated; examples include: succinic acid, adipic acid, sebacic acid, suberic acid, azelaic acid, phthalic acid, phthalic acid anhydride, isophthalic acid, tetrahydrophthalic acid anhydride, trimellitic acid, hexahydrophthalic acid anhydride, tetrachlorophthalic acid anhydride, endomethylene tetrahydrophthalic acid anhydride, glutaric acid anhydride, fumaric acid, maleic acid, maleic acid anhydride, dimeric and trimeric fatty acid such as oleic acid, optionally mixed with monomeric fatty acids, dimethylterphthalate and bisglycol terephthalate. Any suitable polyhydric alcohol may be used such as, for example, ethylene glycol; propylene-1-2 and -1,3-glycol; butylene-1,4-and -2,3-glycol; propylene-1,2- and -1,3-glycol; butylene-1,4- and -2,3-glycol; hexane-1,6-diol; octane-1,8-diol; neopentyl glycol; cyclohexanedimethenol-1(1,4-bishydroxymethyl-cyclohexane); 2-methylpropane-1,3-diol; glycerol: trimethylol propane; pentaerythritol; quinitol; mannitol and sorbitol; methyl glycoside; diethylene glycol; triethylene glycol; tetraethylene glycol; polyethylene glycols; dipropylene glycol; polypropylene glycols; dibutylene glycol and polybutylene glycols. The polyesters may also contain a proportion of carboxyl end groups. Polyesters of lactones, such as ε-caprolactone, or hydroxycarboxylic acid such as ω-hydroxycaproic acid, may also be used.

The polyethers with at least 2, generally from 2 to 8 and preferably 2 or 3, hydroxyl groups used according to the invention are known and may be prepared, e.g., by the polymerization of epoxides, e.g., ethylene oxide, propylene oxide, butylene oxide, tetrahydrofurane oxide, styrene oxide or epichlorohydrin, each with itself, e.g., in the presence of BF, or by addition of these epoxides, optionally as mixtures or successively, to starting components which contain reactive hydrogen atoms such as alcohols or amines, e.g., water, ethylene glycol; propylene-1,3-or -1,2-glycol; trimethylol propane; 4,4- dihydroxydiphenyl propane, aniline, ammonia, ethanolamine or ethylenediamine; sucrose polyethers such as those described, e.g., in German Auslegeschriften Nos. 1,175,358 and 1,064,938, may also be used according to the invention. It is frequently preferred to use polyethers which contain predominantly primary OH groups (up to 90% by weight, based on the total OH groups contained in the polyether). Polyethers modified with vinyl polymers such as those which may be obtained by polymerizing styrene or acrylonitriles in the presence of polyethers, (U.S. Pat. Nos. 3,383,351; 3,304,273; 3,523,093 and 3,110,695; and German Pat. No. 1,152,536) and polybutadienes which contain OH groups are also suitable.

By "polythioethers" are meant, in particular, the condensation of thiodigylcol with itself and/or with other glycols, dicarboxylic acids, formaldehyde, aminocarboxylic acids or amino alcohols. The products obtained are polythiomixed ethers or polythioether ester amides, depending on the co-component.

The polyacetals used may be, for example, the compounds which may be obtained from glycols, 4,4′-dihydroxydiphenyl-methylmethane, hexanediol, and formaldehyde. Polyacetals suitable for the invention may be preared by the polymerization of cyclic acetals.

The polycarbonates with hydroxyl groups used may be of the kind, e.g., which may be prepared by reaction diols, e.g., propane-1, 3-diol; butane-1, 4-diol; and/or hexane-1,6-diol or diethylene glycol, triethylene glycol or tetraethylene glycol, with diarylcarbonates, e.g. diphenylcarbonates or phosgene.

The polyester amides and polyamides include, e.g., the predominantly linear condensates obtained from polyvalent saturated and unsaturated carboxylic acids or their anhydrides, any polyvalent saturated and unsaturated amino alcohols, diamines, polyamines and mixtures thereof.

Polyhydroxyl compounds which contain urethane or urea groups, modified or unmodified natural polyols, e.g., castor oil, carbohydrates and starches, may also be used. Additional products or alkylene oxides with phenol formaldehyde resins or with urea-formaldehyde resins are also suitable for the purpose of the invention.

Examples of these compounds which are to be used according to the invention have been described in High Polymers, Volume XVI, "Polyurethane, Chemistry and Technology", published by Saunders-Frisch Interscience Publishers, New York, London Volume I, 1962, pages 32 to 42 and pages 44 to 54, and Volume II, 1964, pages 5 and 16 and pages 198 and 199; and in Kunststoff-Handbuch, Volume VII, Vieweg-Hochtlen, Carl-Hanser-Verlag, Munich, 1966 on pages 45 to 71.

COMPONENT (C)

Any suitable organic compound that will cause the aqueous alkali silicate solution or suspension to solidify or coagulate but not react with the alkali metal oxide may be used in this invention. Suitable organic compounds include but are not limited to alcohols, polyalcohols, amines, aldehydes, amino compounds, ketones, nitriles, epoxides, thioalcohols and mixtures thereof.

Any suitable alcohol may be used, but are not limited to, methyl, ethyl, propyl, butyl, amyl, hexyl, heptyl, octyl, nonyl, decyl, hendecyl, dodecyl, tetradecyl, cetyl and octadecyl alcohols, furfuryl alcohol, cyclohexanol, methylcyclohexanol, allyl alcohol, methallyl alcohol, cyclohexanomethanol, benzyl alcohol, thioalcohols, thiophenols, thiocresols, etc.

Any suitable aldehyde may be used, but is not limited to, formaldehyde, acetaldehyde, propionaldehyde, butyl aldehyde, pentanals, hexanals, heptanals, octanals, etc.

The polyalcohols (polyol) listed in component (b) with a hydroxyl no. greater than 100 may be used as component (c).

Suitable amines include, but are not limited to, aliphatic monoamines and polyamines, aromatic monoamines and polyamines, cycloalkane amonoamines and polyamines, etc.

The tertiary amines which are used as polyurethane catalyst are preferred, e.g., triethylamine, tributylamine, N-methyl-morpholine, N,N,N′,N′-tetramethylenediamine, 1,4-diazobicyclo-(2,2,2) -octane, N-methyl-N′-dimethylaminoethyl piperazine, N,N-dimethylbenzylamine, bis (N,N-diethylaminoethyl) adipote, etc. Suitable monoamines include, but are not limited to, ammonia, methylamine, ethylamine, propylamine, isopropylamine, butylamine, isobutylamine, amylamine, isoamylamine, hexylamine, heptylamine, trimethylamine, triethylamine, tripropylamine, tributylamine, triisobulyamine, etc. Suitable polyamine include, but are not limited to, dimethylamine, diethylamine, dipropylamine, diisopropylamine ,dibutylamine, diisobutylamine, diisoamylamine, etc.

Any suitable ketones may be used such as, but not limited to, methyl methylketone, methyl ethyl ketone, methylisopropyl ketone, methyl-isobutyl ketone, methyl-isoamyl ketone, methyl-n-propyl ketone, methyl-n-butyl ketone, methyl-t-butyl ketone, methyl-furanyl ketone, methyl-tetrahydrofuranyl ketone, methyl-heptyl ketone, ethylhexyl ketone, acetonphenone, propiophenone, etc.

Any suitable nitrile may be used such as, but not limited to, acetonitrile, propionitrile, butyronitrile, tolunitrile, hexahydrobenzonitrite, acrylonitrile, allylnitrile, methallylnitrile, methacrylonitrile, etc.

Any suitable epoxide compound may be used such as, but not limited to, ethylene oxide, propylene oxide, butylene oxide, tetrahydrofuran oxide, styrene oxide, polyepoxides, etc.

Any suitable amino compound, e.g., urea, may be used in this invention. Suitable compound of component (c) is a compound or radical containing a functional group corresponding to one of the following general formulae:

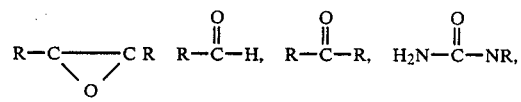

RCN, wherein R is H, CH$_3$—, C$_2$H$_5$— or C$_3$H$_7$—

The stable polyol-alkali metal silicate emulsion is useful in the production of polyurethane silicate solid and foamed products. The polyol-alkali metal silicate emulsion may be used in the polyurethane foaming machines which are made to handle a filler in the polyol component, usually called Component B with the polyisocyanate as Component A. The polyol-alkali metal silicate emulsion, optionally containing an amine polyurethane catalyst, organic metal compound, surface-active agent and a blowing agent, is mixed with a compound containing at least 2 isocyanate radicals and is allowed to react, thereby producing a polyurethane silicate solid or foamed product. The polyurethane silicate solid or foamed product. The polyurethane silicate foam and solid products have many uses, such as for thermal and sound insulation, as light-weight construction panels and as coating agents for wood, metals and plastics. The polyol-alkali metal silicate emulsion may also be used to produce alkali metal polyester silicate resinous products which may be used as coating agents, as adhesives, as molding agents, etc. The preferred method to produce polyurethane silicate products is to thoroughly mix the polyol-alkali metal emulsion, containing the desirable additives, with a compound containing at least 2 isocyanate radicals then pouring or spraying the mixture on a desirable substrate or into a mold.

SUMMARY OF THE INVENTION

The components may be mixed in any suitable method to produce the polyol-alkali metal silicate emulsion such as simultaneously or by mixing any two components first, then adding the third component last while agitating between ambient temperature and 100° C. for 10 to 120 minutes. Any suitable pressure may be used usually ambient pressure is satisfactory except where one of the components is a gas then elevated pressure is necessary.

The components may be mixed in any suitable proportions, the preferred proportions being:
Component (a) 1 to 50 parts by weight of an aqueous alkali metal silicate;
Component (b) 25 to 100 parts by weight of a polyol;
Component (c) up to 25 parts by weight of an organic compound that will solidify or coagulate aqueous alkali metal silicate solution or suspension.
Optional components;
(1) up to 20% by weight of each surface-active additives (emulsifier, foam stabilizer)
(2) up to 20% by weight of a dispersion stabilizer
(3) up to 50 parts by weight of a vinyl monomer and a catalytic amount of a free-radical initiator (peroxide initiator)
(4) up to 100% by weight of an oxidated silicon compound
(5) up to 20% by weight of a water-binding agent
(6) up to 50 parts by weight of an organic polymer in a fluid state
(7) up to 50 parts by weight of an organic diene and a catalytic amount of a free-radical initiator
(8) 1 to 100 parts by weight of a compound containing at least two isocyanate radicals are added to 1 to 50 parts by weight of the polyol-alkali metal silicate emulsion
(9) up to 10% by weight of an organo-metallic compound
(10) up to 10% by weight of a salt forming compound
(11) up to 100 parts by weight of an inert filler
(12) up to 50% by weight of a blowing agent percentage is based on weight of Components (a), (b) and (c)

A surface-active additive (emulsifiers and foram stabilizers) may be added to the components. Any suitable surface-active additive may be used. The surface-active additive may be non-ionic, anionic or cation. Suitable surface-active additive include, but not limited to, the sodium salts of ricinoleic sulphonates or of fatty acids or salts of fatty acid with amines, e.g., oleic acid diethylamine or stearic acid diethanolamine, alkali metal or ammonium salts of sulphonic acid, e.g., dodecylbenzene sulphonic acid or dinaphthyl methane disulphonic acid, or fatty acids such as ricinoleic acid, or polymeric fatty acids and others. The foam stabilizers used are mainly water-soluble polyester siloxanes. These compounds generally have a polydimethylsiloxane group attached to a copolymer of ethylene oxide and propylene oxide. Foam stabilizers of this kind have been described in U.S. Pat. No. 3,629,308.

Suitable polymeric additives which are water-soluble and have the ability to hydrate and swell may be used as dispersion stabilizers in this invention. Dispersion stabilizers such as salts of polymethacrylic acid, copolymeric poly (methacrylic acids), polymaleic acids and copolymeric polymaleic acids; water-soluble derivatives of cellulose, plant gums, casein, starch, sodium alginate, bentonite, natural and synthetic latexes, sulfonated polyisoprene resins, sulfonated phenol-formaldehyde resins, sulfonated melamine-formaldehyde resins, polyamines, polysilicic acid, sodium poly (methacrylic silicate), poly (sodium acrylic silicate), copolymeric poly (sodium acrylic silicate), poly (sodium methacrylic silicate), copolymeric poly(sodium methacrylic silicate), polyvinyl decanol and mixtures thereof.

Any suitable organic compound containing at least 2 isocyanate radicals may be used in this invention. Suitable organic polyisocyanates may be aliphatic, cycloaliphatic, araliphatic, aromatic and heterocyclic polyisocyanates are well known in the arts. Suitable polyisocyanates which may be employed in the process of the invention are exemplified by the organic diisocyanate which are compounds of the general formula:

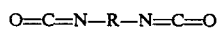

$$O{=}C{=}N{-}R{-}N{=}C{=}O$$

wherein R is a divalent organic radical such as an alkylene, aralkylene or arylene radical. Such radicals may contain, for example 2 to 20 carbon atoms. Other polyisocyanates, polyisothioryanates, fatty diisocyanates, and their derivatives may be equally employed. Inorganic and silicon polyisocyanate are also suitable according to the invention. Examples of useful polyisocyanate may be found listed in U.S. Pat. No. 4,296,211, page 4–6, in High Polymers, Volume XVI, "Polyurethane Chemistry and Technology", published by Saunders-Frisch Interscience Publishers, New York, London, Volume I, 1962, pages 32 to 42 and pages 44 to 54, and Volume II, 1964, pages 5 and 16 and pages 198 and 199 and are incorporated herein by reference.

It's generally preferred to use commerially readily available polyisocyanate, e.g., tolylene-2,4 and −2,6 diisocyanates and any mixtures of these isomers ("TDI") Polyphenyl-polymethylene-isocyanates obtained by aniline-formaldehyde condensation followed by phosgenation and modified polyisocyanates. The preferred compound with at least two isocyanate radicals are polyphenyl-polymethylene-isocyanates obtained by aniline-formaldehyde condensation followed by phosgenation.

Any suitable water-binding agent such as hydraulic cement, synthetic anhydrides, gypsum, or burnt lime may be added to the polyol-alkali metal silicate emulsion to chemically bind any excess water not bound by the alkali metal silicate. A detailed description in Encyclopedia of Chemical Technology, Volume 4, Second Edition, Published by Kirk-Othimer, pages 684–710, of the type of hydraulic cements which may be used in the products of this invention and are incorporated herein by reference.

Any suitable salt forming compound may be used in this invention, such as mineral acid, organic acid, organic anhydride, organic esters, hydrogen containing alkali metal salts, calcium sulfate, barium sulfate; ammonium salts, amides, substituted organic compounds, etc.

In the production of polyurethane silicate foam blowing agent may be used. Any suitable blowing agent may be used such as inert liquids boiling at temperatures of from −25° to 50° C. Suitable blowing agents include alkanes, alkenes, halogen-substituted alkanes and alkenes or dialkyl ethers. These agents are well known in the arts. Air may be used as the blowing agent. Fine metal powder such as powdered calcium, magnesium, aluminum or zinc may also be used as blowing agents since they evolve hydrogen in the presence of an aqueous alkali metal silicate solution. Compounds that decompose at temperatures above room temperature to liberate a gas such as nitrogen may be used as the blowing agent. The chloro fluoro alkanes are the preferred blowing agents.

Polyurethane catalyst may be used in the production of polyurethane silicate products such as tertiary amines, silaamines, bases containing nitrogen such as tetraalkyl ammonium, alkali metal phenolates, sodium hydroxide, alkali metal alcoholates, amino compounds, hexahydrotriazines and organic metal compounds, especially organic tin compounds. These catalysts are well known in the arts.

Solid inert fillers may be added to the polyol-alkali metal silicate emulsion. They may be organic or inorganic substances and may be in the form of powders, hollow beads, granulate, wire, fibers, dumb bells, crystallites, spirals, rods, beads, foam particles, webs, woven fabric, ribbons, etc. Any commonly known inert filler known in the Arts may be used.

Any suitable vinyl monomer may be used in this invention. Suitable vinyl monomers include, but are not limited to styrene, vinyl acetate, sodium acrylate, acrylates, vinyl chloride, vinylidine chloride, acrylonitrile, vinyl toluenes, N-vinyl carbazole, vinyl pyrovidone, vinylidine cyanide, alkyl vinyl ketones, aryl vinyl ketones, methacrylonitrile and mixtures thereof.

Suitable acrylate compounds include, but are no limited to, methyl methacrylate, methyl acrylate, ethyl acrylate, propyl acrylate, butyl acrylate, pentadecyl acrylate, hexadecyl acrylate, benzyl acrylate, cyclohexyl acrylate, phenyl ethyl acrylate, ethyl methacrylate, methyl chloroacrylate, 2-chloro-ethyl acrylate; 1,1-dihydroperfluorobutyl acrylate; ethylenemethacrylate, lauryl acrylate, cyclohexylcyclohexyl methacrylate, allyl methacrylate and mixtures thereof.

Acrylic acid compounds should be first reacted with an alkali metal radical to produce an alkali metal acrylate. Suitable acrylic acid compounds include, but are not limited to, acrylic acid, methacrylic acid, sthylacrylic acid, benzyl acrylic acid, chloroacrylic acid, cyclohexyl acrylic acid, fluoroacrylic acid, cyclohexyl methacrylic acid, isobutyl methacrylic acid, crotonic acid and mixtures thereof.

Up to 50% by weight of an organic diene may be added with the vinyl monomer, percentage based on the weight of the vinyl monomer. Suitable organic dienes include, but are not limited to, isoprene, chloroprene, butadiene and mixtures thereof. The organic dienes are added at a temperature and pressure wherein the diene is in a liquid or pressurized state.

Any suitable initiator which will promote the polymerization of a solution of a vinyl monomer may be used in this invention. The controlled polymerization of the vinyl monomer in the aqueous alkali metal silicate, in order to yield fully cured solids, usually required the use of an initiator. Only a catalytic amount of an initiator is needed and the amount may vary up to 1% by weight base on the vinyl monomer.

Any suitable free-radical initiator, such a organic and inorganic peroxides, azo compounds, alkali metal persulfates, ammonium persulfates and mixtures thereof, may be used. The fact that the action of organic peroxide can be modified by activators and promoters, plus their ready availability at reasonable cost, makes them preferably in this invention. Thermal and photopolymerization may be used in certain cases.

suitable organic peroxide initiators include, but are not limited to, acetyl benzoyl peroxide, methyl ethyl ketone peroxide, cyclohexanone peroxide, cyclohexyl hydroperoxide, 2,4-dichlorobenzoyl peroxide, cumene hydroperoxide, tert-butyl hypoperoxide, methyl amyl ketone peroxide, lauryl peroxide, benzoyl peroxide, tert-butyl perbenzoate, di-tert-butyl diperphthalate, and mixtures thereof.

Activators and promoters, used in conjunction with the initiators such as cobalt which, in the form of its ethyl hexanoate or napthanate salt, is a good, general-purpose activator for use with ketone peroxides, may be added to the vinyl monomer. Concentration as low as 30 ppm of cobalt metal will activate a system.

Other activators may be added to the vinyl monomers such as tertiary dialkyl aryl amines, e.g., diethyl aniline, and aliphatic thiols, e.g., lauryl mercaptan, when acyl peroxides are used. When alkali metal or ammonium persulfates are used, ferric sulfate and cupric sulfate may be added to the unsaturated polyester resin.

Promoters used with acyl peroxide include tertiary dialkyl aryl amines such as diethyl aniline and aliphatic thiols, such as, for example, lauryl mercaptan. Concentrations used are most often in the range of up to 0.5% of active substances. Promoters usually are strong reducing agents and initiators are strong oxidizing agents.

Suitable alkali metal persulfates include potassium and sodium persulfate. Redox systems may also be utilized in this invention.

The stable vinyl monomer polyol-alkali metal silicate emulsion is useful in the production of vinyl polymer-polyurethane silicate resinous and foamed products.

The vinyl polymer-polyol-alkali metal silicate emulsion may be used in the polyurethane foaming machines which are made to handle a filler in the polyol component, usually called Component (b). The vinyl polymer-polyol-alkali metal silicate emulsion, optionally containing an amine catalyst, blowing agent, organo-metallic compound and surface-active agent, is mixed with a polyisocyanate or isocyananate-terminated polyurethane prepolymer and is allowed to react, thereby producing a vinyl polymer-polyurethane silicate resinous or foamed product. The vinyl polymer-polyurethane silicate foam and resinous products have many uses, such as for thermal and sound insulation, as light-weight construction panels, and as coating agents or wood, metal and plastics.

The preferred method to produce vinyl polymer polyol-alkali metal silicate emulsion is to mix the polyol, vinyl monomer, peroxide initiator and suitable salt, then to add the alkali metal silicate while agitating between ambient temperature and the boiling point of the vinyl monomer at ambient pressure for 10 to 60 minutes except when the vinyl monomer is a gas, then to cool the mixture while agitating, thereby producing a stable vinyl polymer-polyol-alkali metal silicate emulsion. When the vinyl monomer is a gas such as vinyl chloride, it is slowly added to the mixture of the component while agitating in a closed system at a suitable temperature.

The object of the present invention is to provide a novel process to produce a stable polyol-alkali metal silicate suspension. Another object is to produce stable polyol-alkali metal silicate emulsion which may be used with a compound which contains at least two isocyanate radicals to produce polyurethane silicate products. Another object is to produce polyol-alkali metal silicate emulsions which will react with polycarboxyl polyanhydride compounds to produce alkali metal polyester resins. Still another object is to produce organic polymer-polyol-alkali metal silicate emulsions for use in the production of polyurethane silicate products.

DESCRIPTION OF PREFERRED EMBODIMENTS

My invention will be illustrated in greater detail in the specific Examples which follows, which detail the preferred embodiment of my process. It should be understood that the scope of my invention is not limited to the specific processes set out in the Examples. Parts and percentages are by weight, unless otherwise indicated.

EXAMPLE 1

About 50 parts by weight of an aqueous solution containing 40% by weight of sodium silicate with a $SiO_2:Na_2O$ ratio of 3.25:1 is mixed with 50 parts by weight of a polyol selected from the list below and 1 part by weight of an emulsifier sodium doctyl sulfosuccinate mixed. The aqueous sodium silicate solidifies or coagulates and the mixtures is thoroughly agitated for 10 to 120 minutes to produce a polyol-alkali metal silicate emulsion.
  (a) ethylene glycol (mol. wt. 600)
  (b) propylene glycol (mol. wt. 500)
  (c) propylene glycol (mol wt. 1200)
  (d) amine sucrose polyether polyol (hydroxyl no. 350)
  (e) sucrose polyether polyol (hydroxyl no. 360)
  (f) phenyl amine polyol (hydroxyl no. 530)
  (g) propylene polyether triol (hydroxyl no. 650)
  (h) caprolactone diol (hydroxyl no. 212)
  (i) amine polyol (hydroxyl no. 475)
  (j) aromatic polyol (hydroxyl no. 375)
  (k) sorbitol-based polyol (hydroxyl no. 490)
  (l) polyester polyol (hydroxyl no. 210)
  (m) polyurea-filled polyether polyol (hydroxyl no. 28)
  (n) castor oil
  (o) phenolic polyol (hydroxyl no. 450)
  (p) sucrose polyol (hydroxyl no. 480)
  (q) polypropylene polyether triol (hydroxyl no. 225)
  (r) polypropylene polyether triol (hydroxyl no. 645)
  (s) mixtures of the above

EXAMPLE 2

About 40 parts by weight of an aqueous solution containing 45% by weight of sodium silicate with a $SiO_2:Na_2O$ ratio of 3.25:1, 50 parts by weight of a polypropylene triol (hydroxyl no. 56 and mol. wt. 3000), 0.5 part by weight of foam stabilizer (DOW 193 by DOW) and component (c) selected from the list below are mixed and thoroughly agitated for 10 minutes to 120 minutes thereby producing a polyol-alkali metal silicate emulsion with the water attached to the alkali metal silicate.
  (a) methanol, 5 parts by weight
  (b) ethanol, 5 parts by weight
  (c) isopropanol, 5 parts by weight
  (d) aqueous formaldehyde (35%), 5 parts by weight
  (e) urea powder, 10 parts by weight
  (f) propylene oxide, 5 parts by weight
  (g) propylamine, 2 parts by weight
  (h) diethylenetriamine, 2 parts by weight
  (i) acetaldehyde, 5 parts by weight
  (j) acetonitrile, 5 parts by weight
  (k) thiophenol, 5 parts by weight
  (l) amine polyol (hydroxyl no. 475), 5 parts by weight
  (m) furfurol, 5 parts by weight
  (n) acetone, 10 parts by weight
  (o) allyl alcohol, 10 parts by weight
  (p) triethylamine, 1 part by weight
  (q) ethanolamine, 3 parts by weight
  (r) methyl ethyl ketone, 3 parts by weight
  (s) diethamolamine, 5 parts by weight
  (t) N-methyl morpholine, 3 parts by weight
  (u) tributylamine, 2 parts by weight
  (v) N,N-dimethylcyclohexylamine, 1 part by weight
  (w) furfuryl alcohol, 10 parts by weight
  (x) tetrahydrofuran, 10 parts by weight
  (y) cyclohexanol, 10 parts by weight
  (z) mixtures of the above

EXAMPLE 3

About 50 parts by weight of an aqueous solution containing about 32% sodium silicate with a $SiO_2:Na_2O$ ratio of 3.75:1 is mixed with 5 parts by weight of one of the Components (c) listed in Example 2 thereby produced a solidified or coagulated sodium silicate which is broken into fine particles and thoroughly mixed and emulsified with 100 parts by weight of a polyol selected from the list in Example 1 thereby producing a polyol-alkali metal emulsion with the water attached to the alkali metal silicate.

EXAMPLE 4

About 50 parts by weight of an aqueous suspension containing about 30% sodium silicate with a $SiO_2:Na_2O$ ratio of 3.22 and 10% polysilicic acid is mixed with 75 parts by weight of a polypropylene triol (OH no. 56 and mol. wt. 3000) containing 1 part by weight of a foam stabilizer (DOW 193 by DOW) then thoroughly agitated. To this mixture 5 parts by weight of ethylene glycol and 1 part by weight of triethyleneamine are added and the mixture is emulsified thereby producing a polyol-alkali metal silicate emulsion with the water attached to the alkali metal silicate.

EXAMPLE 5

Example 4 is modified wherein another alkali metal silicate is used in place of sodium silicate and selected from the list below:
  (a) potassium silicate
  (b) lithium silicate
  (c) mixtures of the above

EXAMPLE 6

Example 4 is modified wherein 20 parts by weight of an aqueous emulsion or suspension containing 40% by weight of an organic polymer selected from the list below is added with the polyol.
(a) polyvinyl acetate
(b) polyvinyl alcohol
(c) polyvinyl chloride
(d) poly (methyl methacrylate)
(e) poly (sodium methacrylate)
(f) poly (sodium acrylate)
(g) poly (vinylidene chloride)
(h) polyisoprene
(i) polychloroprene
(j) poly (butadeine-acrylonitrile) copolymer
(k) poly (butadeine-styrene) copolymer
(l) poly (vinyl formal) polymer
(m) poly (vinyl chloride-vinyl acetate) copolymer
(n) mixtures of the above

EXAMPLE 7

Example 1 is modified wherein 10 parts by weight of an polymerizeable organic compound selected from the list below, 0.5 parts by weight of sodium dactyl sulfosuccinate, 0.5 parts by weight of triethylenediamine, 0.05 parts by weight of cobalt naphthanate, 0.05 parts by weight of tin octoate, 0.1 part by weight of potassium persulfate, 0.1 part by weight of potassium persulfate, 0.1 part by weight of benzoyl peroxide, 0.05 parts by weight of N,N-dimethyl aniline and 0.005 parts by weight of cupric sulfate are mixed with the polyol of Example 1 and then mixed with the aqueous alkali metal silicate solution thereby producing on organic polymer-polyol-alkali metal silicate emulsion with the water attached to the alkali metal silicate.
(a) styrene
(b) acrylonitrile
(c) methyl methacrylate
(d) vinyl acetate
(e) N-vinyl carbazole
(f) vinylidene chloride
(g) vinyl pyrovidone
(h) methacrylonitrile
(i) ethyl acrylate
(j) methyl acrylate
(k) allyl methacrylate
(l) vinyl toluene
(m) chloroprene
(n) isoprene
(o) vinyl chloride under pressure to liquify
(p) butadiene under pressure 45 to 60 p.s.i.g. in a closed system
(q) mixtures of the above

EXAMPLE 8

Example 1 is modified wherein 1 part by weight of a salt forming compound selected from the list below is added and thoroughly mixed with the polyol-alkali metal silicate emulsion of example:
(a) aqueous solution containing 20% phosphoric acid
(b) sodium dihydrogen phosphate
(c) sodium hydrogen sulfate
(d) adipic acid
(e) acetic acid
(f) maleic anhydride
(g) fumaric acid
(h) chloroacetic acid
(i) acetyl chloride
(j) ethyl acetate
(k) ethanesulphonic acid
(l) ethylene chlorohydrin
(m) mixtures of the above

EXAMPLE 9

Example 1 is modified wherein 5 parts by weight of a dispersion stabilizer selected from the list below is added to the polyol-alkali metal silicate emulsion of Example 1:
(a) starch
(b) casein
(c) bentonite
(d) sulfonated polyisoprene resin
(e) sulfonated phenol-formaldehyde resin
(f) sodium salt of polymethacrylic acid
(g) polymaleic acid
(h) polysilicic acid
(i) sodium salt of polyacrylic acid
(j) polyvinyl alcohol
(k) plant gum
(l) methyl cellulose

EXAMPLE 10

About 50 parts by weight of an aqueous solution containing 40% by weight of sodium silicate with a $SiO_2:Na_2O$ ratio of 3.22:1, 50 parts by weight of a polypropylene triol with hydroxyl no. 56 and mol. wt. 3000 and 5 parts by weight of propylene glycol are thoroughly mixed to produce a polyolalkali metal silicate emulsion with the water attached to the alkali metal silicate. The emulsion is then mixed with 50 parts by weight of a compound containing at lease 2 isocyanate groups and selected from the list below thereby producing a tough solid or microcellular polyurethane silicate product.
(a) Diphenylmethane Diisocyanate
(b) Hexamethylene diisocyanate
(c) Polymethylene polyphenyl isocyanate (MONDUR MR by MOBAY)
(d) Polymethylene polyphenyl isocyanate (PAPI 27 by UPJOHN)
(e) Polymeric isocyanate (MONDUR E-512 by MOBAY)
(f) 1,5 naphthalene isocyanate (MONDUR N-15 by MOBAY)
(g) tolylene diisocyanate reacted with castor oil to produce a prepolymer having 22% NCO groups
(h) methylene bis-phenyl diisocyanate reacted with a liquid polyepichlorohydrin to produce a prepolymer of about 24% NCO content

EXAMPLE 11

About 30 parts by weight of each of the polyol-alkali metal silicate emulsions of Example 1 are mixed with 0.25 parts by weight of an amine polyurethane catalyst (DABCO -R 80 20 by AIR PRODUCTS), 0.25 parts by weight of a foam stabilizer (DOW 190 by DOW), 5 parts by weight of monofluorotrichloromethane and 20 parts by weight of polymeric MDI (MONDUR MR by MOBAY) are thoroughly mixed and reacted thereby producing foamed polyurethane silicate products.

EXAMPLE 12

About 40 parts by weight of each of the polyol-alkali metal silicate emulsions of Example 2 are mixed with 0.25 parts by weight of an amine polyurethane catalyst (DABCO-R8020 by AIR PRODUCTS), 0.25 parts by weight of a foam stabilizer (DOW 190 by DOW), 3 parts by weight of monofluorotrichloromethane and 30 parts by weight of polymeric MDI (MONDUR MR by MOBAY) are thoroughly mixed and reacted thereby producing a strong flexible polyurethane silicate foam which weights abuout 1 to 2 lb./cu.ft. and is flame retardant.

EXAMPLE 11

Example 1 is modified by admixing 10 parts by weight of a powdered water-binding agent to the polyol-alkali metal silicate emulsion which is selected from the list below:
(a) burnt lime
(b) gypsum
(c) hydroulic cement (Portland cement)
(d) synthetic anhydride
(e) sodium silicate glass ($SiO_2:Na_2O$ ratio of 3.22:1)

EXAMPLE 12

Example 1 is modified by admixing 25 parts by weight of a powdered oxidated silicon selected from the list below to the aqueous alkali metal silicate solution:
(a) silica
(b) polysilicic acid
(c) fumed silica
(d) precipitated silica
(e) hydrated silica
(f) talc
(g) clay
(h) calcium silicate
(i) magnesium silicate
(j) alumino silicate
(k) zeolite
(l) mixtures of the above Although specific material and conditions were set forth in the above examples, these were merely illustrative of preferred embodiment of my invention. Various other compositions, such as the typical materials listed above may be used where suitable. The reactive mixtures and products of my invention may have other agents added thereto to enhance or otherwise modify the reaction and products.

Other modifications of my invention will occur to those skilled in the art upon reading my disclosure. These are intended to be included within the scope of my invention as defined in the appended claims.

I claim:

1. The process for the production of polyol-alkali metal silicate emulsion which consist of mixing the following components:
   (a) aqueous alkali metal silicate solution, 1 to 50 parts by weight;
   (b) a polyol, 25 to 100 parts by weight;
   (c) an effective amount up to 25 parts by weight of an organic compound that will solidify the aqueous alkali metal silicate solution but not react with the alkali metal oxide and is selected from the group consisting of alcohols, polyalcohols, aldehydes, ketones, nitriles, epoxides, amines, amino compounds and mixtures thereof.

2. The product produced by the process of claim 1.

3. The process of claim 1 wherein the alkali metal silicate is selected from the group consisting of sodium silicate, potassium silicate, lithium silicate and mixtures thereof.

4. The process of claim 1 wherein up to 20% by weight of an emulsifying agent is added to the Components (a), (b) and (c), percentage based on weight of Components (a), (b) and (c).

5. The process of claim 1 wherein up to 20% by weight of a foam stabilizer, percentage based on Components (a), (b) and (c), is added with Components (a), (b) and (c).

6. The process of claim 1 wherein up to 10% by weight of a salt-forming compound is added to Components (a), (b) and (c), percentage based on Components (a), (b) and (c).

7. The process of claim 1 wherein up to 20% by weight of a dispersion stabilizer is added to Components (a), (b) and (c), percentage based on Components (a), (b) and (c).

8. The process of claim 1 wherein up to 50 parts by weight of a vinyl monomer and a catalytic amount of a free-radical initiator is added to Components (a), (b) and (c).

9. The process of claim 1 wherein up to 100% by weight of an oxidated silicon compound is added to Components (a), (b) and (c), percentage based on Components (a), (b) and (c), and selected from the group consisting of silica, polysilicic acid, natural silicates, precipitated silica and mixtures thereof.

10. The process of claim 1 wherein up to 20% by weight of a water-binding agent is added to Components (a), (b) and (c), percentage based on Components (a), (b) and (c).

11. The process of claim 1 wherein up to 50 parts by weight of an organic polymer in a fluid state is added to Components (a), (b) and (c).

12. The process of claim 1 wherein up to 100 parts by weight of an inert filler is added to Components (a), (b) and (c).

13. The process of claim 1 wherein up to 50 parts by weight of an organic diene and a catalytic amount of a free-radical initiator is added to Components (a), (b) and (c).

14. The process of claim 1 wherein additional step is taken wherein 1 to 100 parts by weight of a compound containing at least two isocyanate radicals are admixed with 1 to 50 parts by weight of the polyol-alkali metal silicate emulsion produced in claim 1 thereby producing a polyurethane silicate product.

15. The product produced by the process of claim 14.

16. The process of claims 14 wherein up to 50% by weight, percentage based on the weight of Components (a), (b) and (c), of a blowing agent, boiling within the range from 25° C. to 80° C., is added with the polyisocyanate or with the polyolalkali metal silicate emulsion thereby producing a foamed polyurethane silicate product.

17. The product produced by the process of claim 16.

18. The process of claim 14 wherein the compound containing at least two isocyanate radicals is selected from the group consisting of aliphatic, cycloaliphatic, araliphatic, aromatic and heterocyclic polyisocyanates and mixtures thereof.

19. The process of claim 14 wherein the compound containing at least two isocyanate radicals is a phosgenation product of aniline-form aldehyde condensation and mixtures thereof.

20. The process of claim 1 wherein Compound (c) is a compound or radical containing a functional group corresponding to one of the following general formulae:
ROH, RSH, $RNH_2$, $NH_2RNH_2$, 

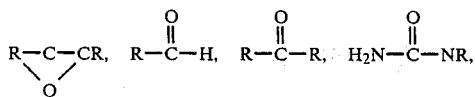
RCN, wherein R is H, $CH_3-$, $C_2H_5-$ or $C_3H_7-$
21. The process of claim 1 wherein Compound (c) is a tertiary amine.
22. The process of claim 1 wherein up to 10% by weight of an organo-tin compound is added to the polyolalkali metal silicate emulsion of claim 1, percentage based on weight of Components (a), (b) and (c).
* * * * *

UNITED STATES PATENT AND TRADEMARK OFFICE
CERTIFICATE OF CORRECTION

PATENT NO. : 4,940,844
DATED : July 10, 1990
INVENTOR(S) : David H. Blount

It is certified that error appears in the above-identified patent and that said Letters Patent is hereby corrected as shown below:

On the title page inventor should read

--(76) Inventor: David H. Blount --.

Signed and Sealed this

Sixth Day of November, 1990

Attest:

HARRY F. MANBECK, JR.

*Attesting Officer*  *Commissioner of Patents and Trademarks*